US012466522B1

United States Patent
Yu

(10) Patent No.: US 12,466,522 B1
(45) Date of Patent: Nov. 11, 2025

(54) INTELLIGENT SHIP NAVIGATION PATH GENERATION METHOD BASED ON VISUAL AND SPATIAL SEMANTIC ENHANCEMENT FOR AN AID TO NAVIGATION

(71) Applicant: WUHAN UNIVERSITY OF TECHNOLOGY, Hubei (CN)

(72) Inventor: Hongchu Yu, Hubei (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 19/093,272

(22) Filed: Mar. 28, 2025

(30) Foreign Application Priority Data

Jun. 28, 2024 (CN) .......................... 202410850996.9

(51) Int. Cl.
| | | |
|---|---|---|
| *B63B 43/18* | (2006.01) | |
| *B63B 49/00* | (2006.01) | |
| *G06V 10/82* | (2022.01) | |
| *G06V 20/56* | (2022.01) | |
| *G08G 3/02* | (2006.01) | |

(52) U.S. Cl.
CPC .............. *B63B 43/18* (2013.01); *B63B 49/00* (2013.01); *G06V 10/82* (2022.01); *G06V 20/56* (2022.01); *G08G 3/02* (2013.01)

(58) Field of Classification Search
CPC ........ B63B 43/18; B63B 49/00; G06V 10/82; G06V 20/56; G08G 3/02
See application file for complete search history.

(56) References Cited

U.S. PATENT DOCUMENTS

| | | | | |
|---|---|---|---|---|
| 6,182,007 B1 * | 1/2001 | Szczerba | ................ | G01C 21/20 |
| | | | | 701/122 |
| 7,047,114 B1 * | 5/2006 | Rogers | ..................... | G08G 3/02 |
| | | | | 701/21 |
| 11,861,894 B1 * | 1/2024 | Estrada | .................. | G06N 20/20 |

FOREIGN PATENT DOCUMENTS

| | | | | | |
|---|---|---|---|---|---|
| CN | 111310646 | A | * | 6/2020 | ............. G06N 3/045 |
| CN | 112966332 | A | | 6/2021 | |
| CN | 112967527 | A | | 6/2021 | |
| CN | 115273557 | A | | 11/2022 | |
| CN | 115577868 | A | | 1/2023 | |
| KR | 20210044197 | A | | 4/2021 | |

OTHER PUBLICATIONS

Wright, R.G. Intelligent Autonomous Ship Navigation using Multi-Sensor Modalities, Google Scholar, TransNav: the International Journal on Maritime Navigation and Safety of Sea Transportation, vol. 13, No. 3, Sep. 2019, pp. 503-510. (Year: 2019).*

(Continued)

*Primary Examiner* — Russell Frejd

(57) ABSTRACT

Disclosed is an intelligent ship navigation path generation method based on visual and spatial semantic enhancement for an aid to navigation, including: identifying the aid to navigation around a ship and determining a current position of the ship; obtaining a navigable area of the ship based on semantic information of the aid to navigation; removing portions that overlap with high risk areas from the navigable area; selecting a next position of the ship from the navigable area; and repeating the above steps to make real-time corrections to the ship's navigation path.

8 Claims, 2 Drawing Sheets

(56) References Cited

OTHER PUBLICATIONS

Statheros et al, T. Autonomous Ship Collsion Avoidance Navigation Concepts, Technoplogies and Techiques, Google Scholar, Journal of Navigation, vol. 61, Iss. 1, Dec. 2007, pp. 129-142. (Year: 2007).*

Bukhari et al, A.C. A research on an intelligent multipurpose fuzzy semantic enhanced 3D virtual reality simulator for complex maritime missions, Google Scholar, Applied Intelligence, vol. 38, Jul. 2012, pp. 193-209. (Year: 2012).*

Zhang et al, X. Decision-Making for the Autonomous Navigation of Maritime Autonomous Surface Ships Based on Scene Division and Deep Reinforcement Learning, Google Scholar, MDPI, Sensors, Sep. 2019, pp. 1-18. (Year: 2019).*

Pan et al, M. Visual Recognition Based on Deep Learning for Navigation Mark Classification, Google Scholar, IEEE Access, vol. 8, Special Section on Mobile Multimedia: Methodology and Applications, Feb. 2020, pp. 32767-32775. (Year: 2020).*

Yi Lin et al., Collision Analysis of Representative in-place Offshore Platform, China Offshore Platform, Oct. 2012, pp. 27-33, vol. 27, No. 5.

Zhixiang Fang et al., Automatic Identification System-Based Approach for Assessing the Near-Miss Collision Risk Dynamics of Ships in Ports, IEEE Transactions on Intelligent Transportation Systems, vol. 20, No. 2, 2019, pp. 534-543.

Notice of Allowance of counterpart Chinese Patent Application No. 202410850996.9 issued on Sep. 6, 2024.

First Office Action of counterpart Chinese Patent Application No. 202410850996.9 issued on Aug. 3, 2024.

* cited by examiner

INTELLIGENT SHIP NAVIGATION PATH GENERATION METHOD BASED ON VISUAL AND SPATIAL SEMANTIC ENHANCEMENT FOR AN AID TO NAVIGATION

CROSS-REFERENCE TO RELATED APPLICATIONS

The present application claims priority benefits to the Chinese Patent Application No. 202410850996.9 filed on Jun. 28, 2024, which is incorporated herein by reference in its entirety.

TECHNICAL FIELD

The present invention relates to the field of ship navigation and spatial semantic enhancement, and in particular, to an intelligent ship navigation path generation method based on visual and spatial semantic enhancement model for aids to navigation recognition.

BACKGROUND

Ship navigation technology makes use of advanced technology and equipment to guide the navigation safety of ships in vast waters such as oceans, rivers, and lakes. The core mission of this technology is to help ships avoid obstacles, other ships, and potentially dangerous areas, ensure that they can proceed smoothly along predetermined routes, and accurately locate the ships when necessary. It is crucial to guarantee navigation safety and improve navigation efficiency.

Currently, most ship navigation systems rely on absolute positioning systems to provide precise navigation coordinates. Absolute positioning systems are usually based on satellite navigation technologies such as the Global Positioning System (GPS), which can provide continuous, real-time three-dimensional position and speed information on a global scale. However, such systems that rely on satellite signals have certain limitations. For example, when the signals are disrupted and blocked or the systems fail, accurate ship position information may not be obtained, which undoubtedly brings risks to navigation safety. In addition, traditional navigation systems often lack in-depth understanding and prediction capabilities of the surrounding environment, which limits their navigation performance in complex sea conditions.

With the development of intelligent ship navigation technology, modern ships have begun to use visual perception devices for navigation assistance. These devices can identify aids to navigation from continuously collected images and use these aids to navigation, thereby making up for the positioning inaccuracy of traditional automatic identification systems (AIS) to a certain extent. However, existing visual perception devices mainly identify the shapes and positions of aids to navigation, but lack the recognition and utilization of semantic information contained in the aids to navigation, which limits their application in automatically generating ship navigation paths.

SUMMARY

The present invention proposes an intelligent ship navigation path generation method based on visual and spatial semantic enhancement model for aids to navigation recognition to solve the problem in the prior art that positions of ships cannot be accurately located when signals are disrupted.

To solve the above technical problem, the present invention provides an intelligent ship navigation path generation method based on visual and spatial semantic enhancement model for aids to navigation recognition, including the following steps:

S1: collecting a real-time image during navigation of a current ship, inputting the real-time image into a deep neural network to identify an aid to navigation around the current ship, obtaining a position and semantic information of the aid to navigation, and determining a current position of the current ship based on the position of the aid to navigation and a relative position of the current ship with respect to the aid to navigation at current moment;

S2: excluding dangerous areas, prohibited areas, and operation areas around the current ship to obtain a navigable area of the current ship based on the semantic information of the aid to navigation and the current position of the current ship;

S3: determining whether the current ship may encounter an encountering ship in the navigable area: if so, obtaining a relative speed, relative course, and relative distance of the current ship with respect to the encountering ship based on the real-time image, assessing a collision risk between the current ship and encountering ship to obtain high risk areas, and removing portions that overlap with the high risk areas from the navigable area; if not, directly performing the step S4 below;

S4: assigning probabilities to positions in the navigable area that meet azimuth requirements of sailing of the current ship based on a historical arrival frequency of the current ship, and selecting a position with the highest probability as a next position of the current ship; and S5: repeating the steps S1-S4 to make real-time corrections to the current ship's navigation path.

Preferably, the relative position of the current ship with respect to the aid to navigation includes a relative azimuth angle, a relative pitch angle, and a relative distance. An expression for calculating the relative azimuth angle is as follows:

$$\begin{cases} Ang_{azimuth} = 0°, \mu = \dfrac{pixel_{\mu\_sum} - 1}{2} \\ Ang_{azimuth} = \dfrac{2\mu - pixel_{\mu\_sum} + 1}{pixel_{\mu\_sum}} \times 180°, \mu > \dfrac{pixel_{\mu\_sum} - 1}{2} \\ Ang_{azimuth} = \dfrac{pixel_{\mu\_sum} - 2\mu - 1}{pixel_{\mu\_sum}} \times 180°, \mu < \dfrac{pixel_{\mu\_sum} - 1}{2} \end{cases};$$

where $Ang_{azimuth}$ represents the relative azimuth angle of the current ship with respect to the aid to navigation; $\mu$ represents a coordinate value of a μ-axis, with the μ-axis parallel to a width axis of the real-time image; and $pixel_{\mu\_sum}$ represents a sum of the number of pixels on the μ-axis;

An expression for calculating the relative pitch angle is as follows:

$$\begin{cases} Ang_{elevation} = 0°, v = \frac{pixel_{v\_sum} - 1}{2} \\ Ang_{elevation} = \frac{2v - pixel_{v\_sum} + 1}{pixel_{v\_sum}} \times (-90°), v > \frac{pixel_{v\_sum} - 1}{2}; \\ Ang_{elevation} = \frac{pixel_{v\_sum} - 2v - 1}{pixel_{v\_sum}} \times 90°, v < \frac{pixel_{v\_sum} - 1}{2} \end{cases}$$

where $Ang_{elevation}$ represents the relative pitch angle of the current ship with respect to the aid to navigation; v represents a coordinate value of a v-axis, with the v-axis parallel to an elevation axis of the real-time image; and $pixel_{v\_sum}$ represents a sum of the number of pixels on the v-axis;

Expressions for calculating the relative distance are as follows:

$$D = R \times \cos^{-1}$$

$$\begin{Bmatrix} \cos[rad(\text{lat}_{p1})]\cos[rad(\text{lat}_{p1})] \\ \cos[rad(\text{lon}_{p1} - \text{lon}_{p2})] + \sin[rad(\text{lat}_{p1})]\sin[rad(\text{lat}_{p2})] \end{Bmatrix} \times \pi/180$$

$$\begin{cases} RD_{p1} = \frac{D \times \sin(\phi - \alpha)}{\sin(\alpha - \beta)} \\ RD_{p2} = \frac{D \times \sin(\phi - \beta)}{\sin(\alpha - \beta)} \end{cases} \text{when } \alpha < \phi$$

$$\begin{cases} RD_{p1} = \frac{D \times \sin(\alpha - \phi)}{\sin(\alpha - \beta)} \\ RD_{p2} = \frac{D \times \sin(\beta - \phi)}{\sin(\alpha - \beta)} \end{cases} \text{when } \alpha > \phi$$

where $RD_{p1}$ represents a relative distance between a center point of a real-time image p1 and the aid to navigation, $RD_{p2}$ represents a relative distance between a center point of a real-time image p2 and the aid to navigation, and the real-time image p1 and the real-time image p2 are two continuously collected real-time images containing the same aid to navigation; D represents the distance between the center point of the real-time image p1 and the center point of the real-time image p2; R represents the Earth's radius; ($\text{lat}_{p1},\text{lon}_{p1}$) represents a coordinate of the center point of the real-time image p1 in a latitude and longitude coordinate system, ($\text{lat}_{p2},\text{lon}_{p2}$) represents a coordinate of the center point of the real-time image p2 in a latitude and longitude coordinate system; and rad( ) represents converting degrees into radians; $\alpha$ represents a relative azimuth angle of the center point of the real-time image p1 with respect to the aid to navigation, $\beta$ represents a relative azimuth angle of the center point of the real-time image p2 with respect to the aid to navigation; and $\phi$ represents a relative azimuth angle of the center point of the real-time image p1 with respect to the center point of the real-time image p2.

As the real-time images p1 and p2 are collected at different times by the current ship during navigation, the center points of the real-time images p1 and p2 represent the positions of the current ship at different times. Specially, the real-time image p2 is collected at a current moment by the current ship, and the real-time image p1 is collected at a previous moment by the current ship. Thus, D can be considered as the current ship's navigation distance from the previous moment to the current moment. A speed of the current ship can be obtained based on the current ship's navigation distance and an acquisition time interval between two continuously collected real-time images p1 and p2. Further, $RD_{p1}$ represents the relative distance of the current ship at the previous moment with respect to the aid to navigation, and $RD_{p2}$ represents the relative distance of the current ship at the current moment with respect to the aid to navigation. $\alpha$ and $\beta$ respectively are the relative azimuth angles $Ang_{azimuth}$ at the previous moment and the current moment. $\phi$ can be obtained by the coordinates ($\text{lat}_{p1},\text{lon}_{p1}$) and ($\text{lat}_{p2},\text{lon}_{p2}$).

Preferably, in the step S3, an image set is constructed by continuously collecting real-time images, the relative course and relative distance of the current ship with respect to the encountering ship are determined based on the image set, and in combination with a speed of the current ship, the relative speed of the current ship with respect to the encountering ship is obtained.

Preferably, in the step S3, the expression for calculating the collision risk is as follows:

$$\text{Risk}(Rd,Rv,Rc) = (l_1 \times Rd^{-1} \times Rv)(l_2 \sin(Rc) + l_3 \sin(2Rc))$$

where Rd, Rv, and Rc respectively represent the relative distance, relative speed, and relative course of the current ship with respect to the encountering ship; and $l_1$, $l_2$, and $l_3$ represent constants.

Preferably, in the step S4, the step of obtaining positions that meet azimuth requirements of sailing of the current ship includes:

S41: calculating a first included angle $\theta_{(x,y)(x_{nm},y_{nm})}$ between the current position (x,y) of the current ship and the aid to navigation ($x_{nm},y_{nm}$)

$$\theta_{(x,y)(x_{nm},y_{nm})} = \begin{cases} \arctan\frac{y - y_{nm}}{x - x_{nm}}, x - x_{nm} > 0, y - y_{nm} \geq 0 \\ 360° + \arctan\frac{y - y_{nm}}{x - x_{nm}}, x - x_{nm} > 0, y - y_{nm} < 0; \\ 180° + \arctan\frac{y - y_{nm}}{x - x_{nm}}, x - x_{nm} < 0 \end{cases}$$

S42: randomly selecting an optional position (x,y) in a remaining area, and calculating a second included angle $\theta_{(x_t,y_t)(x_{nm},y_{nm})}$ between the optional position and the aid to navigation:

$$\theta_{(x_t,y_t)(x_{nm},y_{nm})} = \begin{cases} \arctan\frac{y_t - y_{nm}}{x_t - x_{nm}}, x_t - x_{nm} > 0, y_t - y_{nm} \geq 0 \\ 360° + \arctan\frac{y_t - y_{nm}}{x_t - x_{nm}}, x_t - x_{nm} > 0, y_t - y_{nm} < 0; \\ 180° + \arctan\frac{y_t - y_{nm}}{x_t - x_{nm}}, x_t - x_{nm} < 0 \end{cases}$$

S43: taking positions where the first included angle is smaller than the second included angle as the positions that meet the azimuth requirements of sailing of the current ship.

Preferably, when visibility of the current ship during navigation is lower than a preset visibility threshold, the real-time image is dehazed and restored through the following steps:

S11: calculating variogram values of all pixel points in the real-time image, taking pixel points whose variogram values are less than a variogram threshold as bright parts of the real-time image and remaining pixel points as dark parts thereof, and calculating transmittances of the bright parts and the dark parts respectively to obtain a fused transmittance of the real-time image, where an expression for calculating the variogram values is as follows:

$$S(x, y) = \lambda \sqrt{\frac{\sum_{d \in \{r,g,b\}} (I^d(x, y) - v(x, y))^2}{3}};$$

$$v(x, y) = \frac{I^r(x, y) + I^g(x, y) + I^b(x, y)}{3};$$

where $I^d(x,y)$ represents a pixel value of a pixel point (x,y) in any channel; $I^r(x,y)$, $I^g(x,y)$, and $I^b(x,y)$ respectively represent pixel values of the pixel point (x,y) in three channels, namely r, g, and b; v(x,y) represents an average value of the pixel point (x,y) in the three channels of an RGB color space; and λ represents a comparison coefficient;

S12: filtering the fused transmittance through a weighted guided filtering algorithm to obtain a refined transmittance of the real-time image, where an expression for calculating the refined transmittance is as follows:

$$t = a_k I_i + b_k, \forall i \in \omega_k;$$

$$a_k = \frac{\frac{1}{|\omega|} \sum_{i \in \omega_k} I_i p_i - \mu_k \bar{p}_k}{\sigma_k^2 + \frac{\varepsilon}{\Gamma_I(i)}};$$

$$b_k = \bar{p}_k - a_k \mu_k;$$

$$\Gamma_I(i) \frac{1}{N} = \sum_{i}^{N} \frac{\sigma_{I,1}^2(i) + \gamma}{\sigma_{I,1}'^2(i) + \gamma};$$

where $I_i$ represents a guide image, namely a grayscale image of the real-time image; t represents the refined transmittance; |ω| represents the number of pixels in a local window $\omega_k$; $p_i$ represents the i-th output pixel; $\mu_k$ and $\sigma_k^2$ respectively represent mean and variance of pixel values in the local window $\omega_k$; $\bar{p}_k$ represents mean of pixel values of all pixels in the image within the local window $\omega_k$; ε represents a penalty factor to prevent $a_k$ from being too large; N represents the total number of pixels of the image; $\sigma_{I,1}^2(i)$ represents variance of pixel values in the entire image centered at i; $\sigma'_{I,1}{}^2(i)$ represents variance of pixel values in the local window $\omega_k$ centered at i; and γ represents a fixed constant;

S13: dividing the real-time image evenly into four areas, calculating a difference between mean and standard deviation of pixel values of all pixels in the image within each of the areas as an area score, selecting the area with the highest area score as a candidate area, and if the number of pixel points in the candidate area is less than a preset pixel point threshold, outputting an average pixel value of the candidate area as an atmospheric light value, otherwise, performing area division and area scoring on the candidate area again until the number of pixel points in a selected candidate area is less than the preset pixel point threshold;

S14: substituting the refined transmittance and the atmospheric light value into an atmospheric scattering model to obtain a dehazed and restored image, where an expression of the atmospheric scattering model is as follows:

$$J(x) = \frac{I(x) - A}{\max[t(x), t_0]} + A;$$

where J(x) represents pixel values in the dehazed and restored image; I(x) represents pixel values in the real-time image; A represents the atmospheric light value; t(x) represents the refined transmittance; $t_0$ represents a preset transmittance threshold; and max[ ] represents taking the larger of two values.

Preferably, in the step S11, a method for obtaining the variogram threshold includes the following steps:

taking a real-time image with its visibility higher than a preset visibility threshold as an image with good visibility; calculating a variogram S(x,y)' of the real-time image with good visibility; obtaining two continuously collected real-time images p1 and p2 containing the same aid to navigation; calculating relative distances $RD_{p1}$ and $RD_{p2}$ of the center points of the real-time images p1 and p2 with respect to the aid to navigation respectively; and when exactly one-half or three-quarters of pixel values of the real-time image are greater than $$\frac{S(x, y)}{RD_{p1}} RD_{p2},$$

taking $$\frac{S(x, y)}{RD_{p1}} RD_{p2}$$

at this time as a critical value for defining a threshold Δ, where expressions for calculating the relative distances $RD_{p1}$ and $RD_{p2}$ are as follows:

$$\begin{cases} RD_{p1} = \frac{D \times \sin(\phi - \alpha)}{\sin(\alpha - \beta)} \\ RD_{p2} = \frac{D \times \sin(\phi - \beta)}{\sin(\alpha - \beta)} \end{cases} \text{when } \alpha < \phi$$

$$\begin{cases} RD_{p1} = \frac{D \times \sin(\alpha - \phi)}{\sin(\alpha - \beta)} \\ RD_{p2} = \frac{D \times \sin(\beta - \phi)}{\sin(\alpha - \beta)} \end{cases} \text{when } \alpha > \phi$$

where $RD_{p1}$ represents a relative distance between a center point of a real-time image p1 and the aid to navigation, $RD_{p2}$ represents a relative distance between a center point of a real-time image p2 and the aid to navigation, and the real-time image p1 and the real-time image p2 are two continuously collected real-time images containing the same aid to navigation, D represents the distance between the center point of the real-time image p1 and the center point of the real-time image p2, α and β represent relative azimuth angles of the center points of the real-time images p1 and p2 with respect to the aid to navigation respectively; and φ represents a relative azimuth angle of the center point of the real-time image p1 with respect to the center point of the real-time image p2.

Preferably, in the step S1, an image enhancement operation is performed on the real-time image to expand a training set for the deep neural network; the image enhancement operation includes random cropping, random flipping, random color adjustment, random noise addition, and random blurring;

the random cropping arbitrarily crops the real-time image to change the size and content of the real-time image;

the random flipping randomly flips the real-time image up and down or left and right;

the random color adjustment randomly adjusts contrast, brightness, and saturation of the real-time image;

the random noise addition randomly adds noise to the real-time image; and the random blurring uses Gaussian blurring or a median filter to randomly blur the real-time image.

Preferably, a loss function is set to evaluate prediction accuracy of the deep neural network, and an expression of the loss function is as follows:

$$F = IOU^\gamma L_{EIOU};$$

$$L_{EIOU} = 1 - IOU + \frac{\rho^2(b, b^{gt})}{c^2} + \frac{\rho^2(\omega, \omega^{gt})}{C_w^2} + \frac{\rho^2(h, h^{gt})}{C_h^2};$$

$$IOU = \frac{A \cap B}{A \cup B};$$

where γ represents a suppression parameter; A and B represent any two surrounding boxes; b and $b^{gt}$ respectively represent center points of a prediction box and a ground truth box; ρ represents an Euclidean distance between the center points of the prediction box and the ground truth box; c represents length of a diagonal of a bounding box; and $C_w$ and $C_h$ respectively represent width and height of a minimum bounding rectangle of the prediction box and the ground truth box; $w^{gt}$ and $h^{gt}$ respectively represent width and height of the ground truth box; and w and h respectively represent width and height of the prediction box. The area of a bounding box refers to the smallest enclosing area that can enclose both the prediction box and the ground truth box.

In another aspect, an intelligent ship navigation method based on visual and spatial semantic enhancement model for aids to navigation recognition is also provided. The method comprises the above-mentioned steps S1-S5 and a step that the intelligent ship navigates according to the real-time corrected navigation path obtained from the step S5.

The present invention has at least the following beneficial effects:

1. by collecting real-time images of a ship during navigation, aids to navigation around the ship can be identified from the images, and the accurate position of the ship can be deduced from relative positions of the ship with respect to the aids to navigation, thus avoiding the problem of inaccurate positioning of a traditional AIS when signals are disrupted; and 2. by integrating semantic information of the aids to navigation into the ship navigation system, it helps the ship avoid potential dangers, such as reefs and shoals, thus improving navigation safety; moreover, in complex sea conditions or low visibility, the semantic information can help the ship navigation system better understand the surrounding environment and make more reasonable navigation decisions.

DETAILED DESCRIPTION OF THE EMBODIMENTS

The technical solutions in the embodiments of the present invention are clearly and completely described below with reference to the accompanying drawings in the embodiments of the present invention. Apparently, the described embodiments are only some rather than all of the embodiments of the present invention. All other embodiments obtained by those of ordinary skill in the art based on the embodiments of the present invention without creative efforts shall fall within the protection scope of the present invention.

Figure 1:
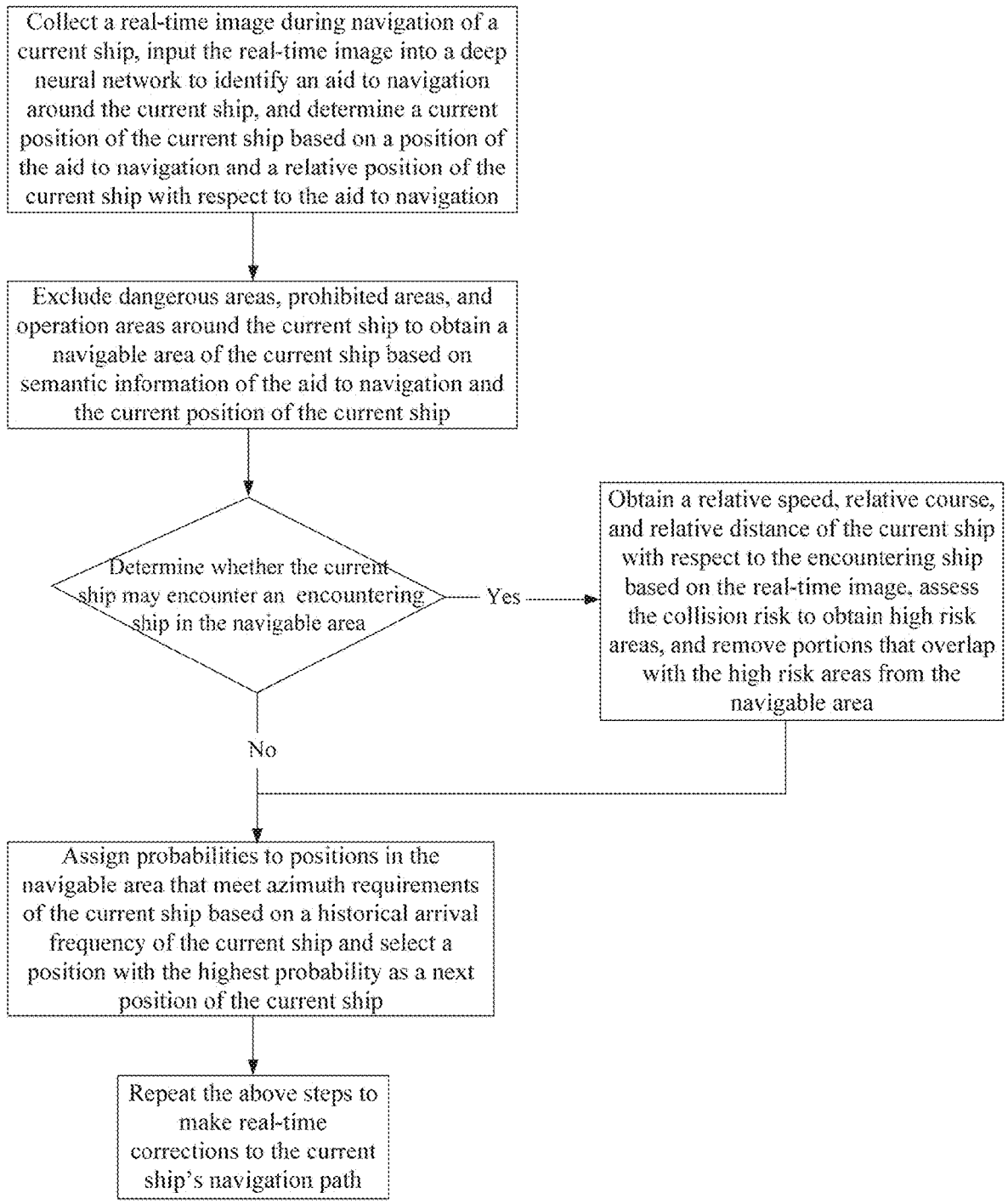
FIG. 1 is a flowchart of a method according to an embodiment of the present invention.

As shown in FIG. 1, an embodiment of the present invention provides an intelligent ship navigation path generation method based on visual and spatial semantic enhancement model for aids to navigation recognition, including the following steps:

S1: labeling positions and functional semantics of aids to navigation in a real view of a port to obtain a training set for a deep neural network.

In the embodiment of the present invention, the Port of Tianjin is selected as the research scenario. As one of the largest comprehensive ports in China, the Port of Tianjin has many advantages, making it an ideal choice for navigation research. A detailed analysis is made on the real view of the Port of Tianjin to grasp specific positions and functions of all aids to navigation distributed in the navigable area in the Port of Tianjin and clearly understand the distribution of aids to navigation in the Port of Tianjin.

Figure 2:
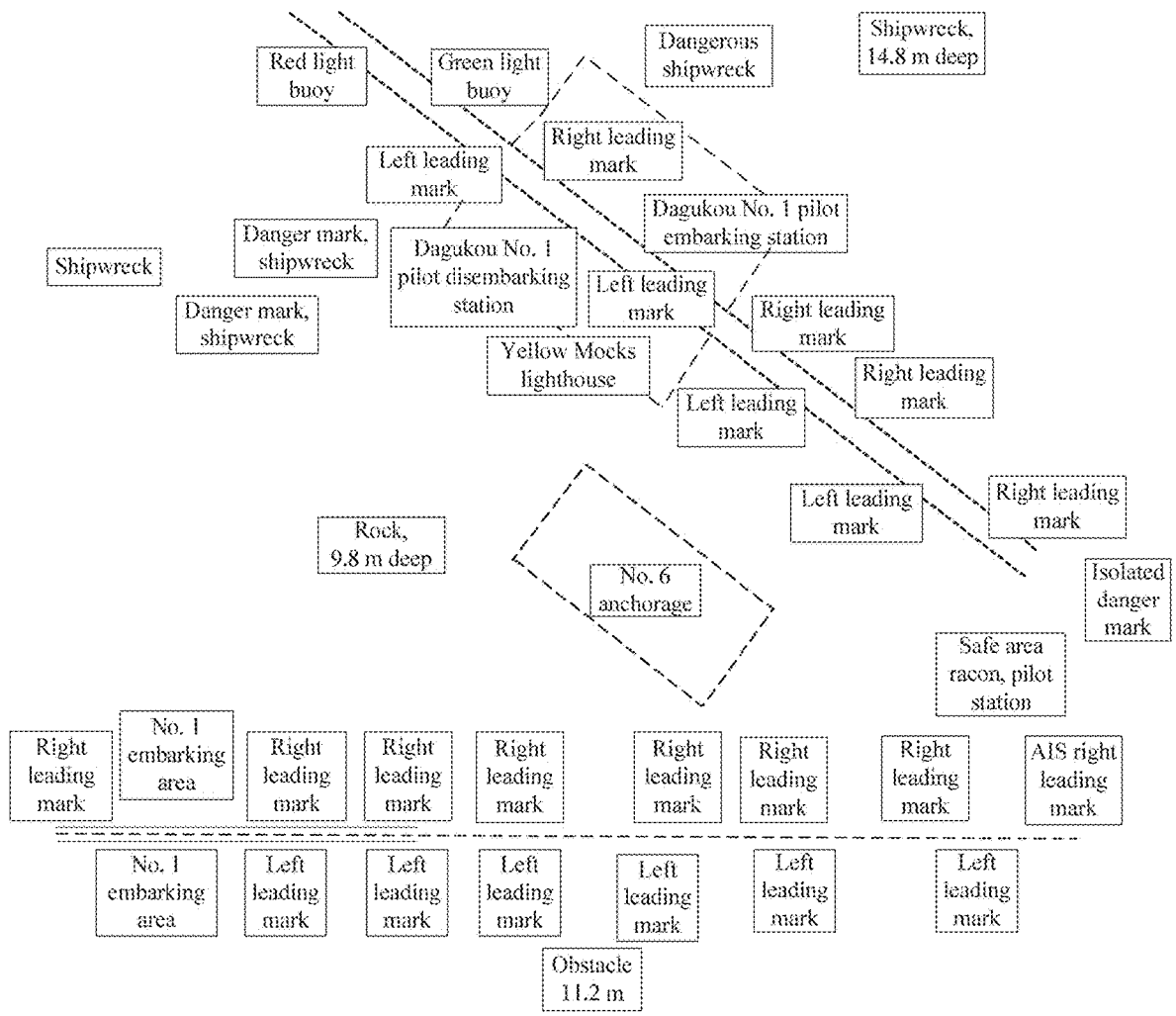
FIG. 2 is a schematic diagram of aids to navigation in the port selected in the embodiment of the present invention.

After having a clear understanding of the functions and distribution of aids to navigation in the Port of Tianjin, work on the labeling of positions and functional semantics of the aids to navigation commences. FIG. 2 shows the positions and names of the aids to navigation distributed in the navigable area in the Port of Tianjin, which are mined from Google Earth, Baidu Maps, shipxy.com, etc. Furthermore, functional semantic information may be assigned to the aids to navigation according to rules such as the Regulation for surface colors of the visual aids to navigation, the Maritime buoyage system, China, the Directives on the layout of floating aids to navigation, and the Regulations for the shape of the marks of maritime buoyage system in China.

Real view data of the Port of Tianjin is obtained and the positions of the aids to navigation are labeled. Since the aids to navigation include various types such as cardinal marks, danger marks, safe water marks, prohibited water marks, navigation operation area marks, submerged structure marks, entertainment area marks, and aquatic operation area marks, when images are labeled, both the positions and the types of the aids to navigation are labeled to facilitate subsequent identification of different types of aids to navigation. After all images are labeled, the labels of the aids to navigation are exported. The data set is classified, with the test image data set and the label data set respectively classified into a training set, a verification set, and a test set, and the images and the labels are placed in their respective folders, corresponding to each other one to one. Then, training files are configured and after the configuration is completed, training can be started.

In the embodiment of the present invention, an improved YOLO algorithm for target detection in images is adopted to identify aids to navigation in the images. By performing data enhancement on the original YOLO algorithm, changing the network structure, adding attention modules, and optimizing the loss function, the original YOLO algorithm is integrated into a comprehensive network to achieve image recognition of an aid to navigation encountered during ship navigation.

Furthermore, considering that when a ship is in different positions, the sizes of the captured images of aids to navigation are different and the resolutions of the images captured by different cameras are different, image enhancement operations are performed on the images in the training set to expand a training set for the deep neural network, mainly including random cropping, random flipping, random color adjustment, random noise addition, and random blurring during the process of pixel-level affine transformation.

The random cropping refers to arbitrarily performing some cropping operations on an original input image to change the size and content of the image and use a changed image as a new input; the random flipping refers to randomly flipping an input image left and right or up and down; the random color adjustment refers to randomly adjusting the contrast, brightness, and saturation of an input image; the random noise addition refers to randomly adding noise to an input image; and the random blurring refers to randomly blurring an input image using Gaussian blurring or a median filter. Through these methods, the data set can be expanded during training, making the model run more robustly.

In addition, since it is possible that multiple images of aids to navigation are collected in images of the same position, the training set needs to be enhanced at an image level. Four images are selected from the training set randomly and spliced, and random processing is performed during splicing. Therefore, different images have different sizes and shapes. The spliced images are connected to the network for training, thereby making the image background richer. This splicing operation increases the number of images (batch_size) input into each training session, thereby enhancing the universality and robustness of the network. In addition, the aspect ratios of the entire data set may be sorted and then four images with similar aspect ratios may be combined together to reduce Flops operations and speed up data processing.

Channel compression and convolution block fusion are performed on the original YOLO algorithm. In the channel compression stage, the number of output channels of the convolutional layer is adaptively adjusted to achieve the compression effect, thereby reducing the number of parameters and the calculation workload. In the convolutional block fusion stage, convolutional blocks with similar characteristics are combined together to form larger convolutional blocks, and irrelevant information is reduced to improve the performance of the model.

The original YOLO algorithm measures prediction accuracy based on the intersection over union (IOU) between the detection box and the ground truth box. When there is no overlap between the ground truth bounding box and the detection box, the evaluation value is always zero, which cannot correctly reflect the closeness between the two bounding boxes; when the detection box and the ground truth bounding box intersect in completely different ways, there may be certain errors in object detection, but the IOU is the same, which may easily lead to misjudgment and misdetection. Therefore, a generalized IOU loss defined as follows is proposed to increase metrics for intersection:

$$L_{GIOU} = 1 - IOU + \frac{|C - (A \cup B)|}{|C|};$$

$$IOU = \frac{A \cap B}{A \cup B};$$

where $L_{GIOU}$ represents the IOU loss, IOU represents the intersection over union; A and B represent any two surrounding boxes; C represents the smallest box that encloses both A and B; when A and B are far apart, the numerator term of the IOU loss function is close to C, the value of the whole expression is large, and the classification effect is poor; and when A and B get closer, the latter term is close to zero, the loss is less, and the function fitting degree is good.

Furthermore, a normalized distance is introduced, and by measuring the length of the diagonal of the smallest enclosing area that can enclose both the prediction box and the ground truth box and the distance between the geometric centers of the corresponding surrounding boxes A and B, the distance-IOU loss is optimized. The distance, overlap rate, and scale between the target box and the anchor box are all taken into account to make the target box regression more stable.

$$L_{DIOU} = IOU - \frac{\rho^2(b, b^{gt})}{c^2};$$

where $L_{DIOU}$ represents the distance-IOU loss; IOU represents the intersection over union; b and $b^{gt}$ respectively represent center points of the prediction box and the ground truth box; $\rho$ represents the Euclidean distance between the two center points; and C represents the length of the diagonal of the smallest enclosing area that can enclose both the prediction box and the ground truth box.

Considering three important geometric factors, namely overlapping area, distance between center points, and aspect ratio, a complete IOU loss calculation method is proposed:

$$L_{CIOU} = 1 - IOU + \frac{\rho^2(b, b^{gt})}{c^2} + \alpha v,$$

$$\alpha = \frac{v}{(1 - IOU) + v};$$

$$v = \frac{4}{\pi^2}\left(\tan^{-1}\frac{w^{gt}}{h^{gt}} - \tan^{-1}\frac{w}{h}\right)^2;$$

where $L_{CIOU}$ represents the complete IOU loss; v represents a parameter used to measure aspect ratio consistency; IOU represents the intersection over union; $\alpha$ represents the weight function; $w^{gt}$ and $h^{gt}$ respectively represent width and height of the ground truth box; w and h respectively represent width and height of the prediction box; b and $b^{gt}$ respectively represent center points of the prediction box and the ground truth box; $\rho$ represents the Euclidean distance between the two center points; and c represents length of the diagonal of the bounding box. The area of the bounding box refers to the smallest enclosing area that can enclose both the prediction box and the ground truth box.

The gradient of v is also taken into account:

$$\frac{\partial v}{\partial w} = \frac{8}{\pi^2}\left(\tan^{-1}\frac{w^{gt}}{h^{gt}} - \tan^{-1}\frac{w}{h}\right) * \frac{h}{w^2+h^2};$$

$$\frac{\partial v}{\partial h} = -\frac{8}{\pi^2}\left(\tan_f^{-1}\frac{w^{gt}}{h^{gt}} - \tan^{-1}\frac{w}{h}\right) * \frac{w}{w^2+h^2};$$

when the length and width are [0,1], the value of $w^2+h^2$ is usually very small, which may cause gradient explosion during calculation, so $$\frac{1}{w^2+h^2}$$

is replaced with 1 during implementation.

Although the overlapping area, distance between center points, and aspect ratio of bounding box regression are all taken into account, v only reflects the aspect ratio of the bounding box and is not associated with the corresponding confidence. Therefore, the above aspect ratio is disassembled and a more effective IOU loss function is proposed:

$$L_{EIOU} = 1 - IOU + \frac{\rho^2(b, b^{gt})}{c^2} + \frac{\rho^2(\omega, \omega^{gt})}{C_w^2} + \frac{\rho^2(h, h^{gt})}{C_h^2};$$

where $L_{EIOU}$ represents the effective IOU loss; IOU represents the intersection over union; $C_w$ and $C_h$ respectively represent width and height of the minimum bounding rectangle of the prediction box and the ground truth box; $w^{gt}$ and $h^{gt}$ respectively represent width and height of the ground truth box; w and h respectively represent width and height of the prediction box; b and $b^{gt}$ respectively represent center points of the prediction box and the ground truth box; ρ represents the Euclidean distance between the two center points; and c represents length of the diagonal of the bounding box. The area of the bounding box refers to the smallest enclosing area that can enclose both the prediction box and the ground truth box.

$L_{EIOU}$ directly minimizes the difference in width and height between the target box and the ground truth box. By subtracting the length and width of the largest box respectively from the length and width of the prediction box, the aspect ratio loss of the original box is changed, thereby contributing to a faster convergence speed of the algorithm, better positioning results, and higher regression accuracy.

Furthermore, since sample imbalance may occur during box regression, the Focal Loss function is introduced to solve this problem. The Focal Loss function is introduced on the basis of EIOU to reduce the contribution of less effective boxes to the results, allowing the model to make more use of high-quality bounding boxes. The formula of the Focal Loss function is as follows:

$$F = IOU^{\gamma} L_{EIOU}$$

where F represents the Focal Loss function; IOU represents the intersection over union; $L_{EIOU}$ represents the effective IOU loss; γ represents a parameter that controls the degree of outlier suppression, the selection range of which is generally between 0.3 and 0.5.

The larger the value of IOU, the greater the cumulative loss effect. At the same time, the loss of high-quality bounding boxes is reduced more, the greater the impact on the final regression effect, the smaller the value of the loss function, and the more accurate the prediction of the deep neural network is.

Furthermore, an attention mechanism is introduced to the original YOLO algorithm:

compression operation: the convolution operation on the original algorithm is only performed locally, and the resulting feature map can only represent the relevant information of the previous layer and does not have global characteristics. In order to improve the direct correlation between relevant channels and avoid the loss of some features caused by separate convolution, the two-dimensional information of the original feature map is compressed and introduced to the global view. The output dimensions are 1×1×C, indicating global average pooling, where C represents the number of channels of the image. The features of each channel are extracted to obtain the corresponding importance coefficient:

$$z_q = F_{sq}(u_q) = \frac{1}{(H \times W)} \sum_{i=1}^{H} \sum_{j=1}^{W} u_q(i, j);$$

where $u_q(i,j)$ represents the input feature map corresponding to the channel q in the position (i,j) of the image; $z_q$ represents the characteristic value of the channel q in the position (i,j) of the compressed image; and H and W respectively represent height and width of the image.

After obtaining the global features of 1×1×C according to the compression operation, the feature map corresponding to each channel is weighted, that is, through a fully connected layer that learns the importance coefficient, a weight vector is obtained, and then the vector is applied to the feature map corresponding to each channel. Two fully connected layers are designed, with one for dimensionality reduction to facilitate subsequent processing, and the other for preventing overfitting to improve generalization capabilities.

The weight vector and the original feature vector W×H×C are multiplied respectively to obtain the attention-enhanced labeling result and realize the feature recalibration operation of the original feature map.

S2: collecting a real-time image during navigation of a current ship, inputting the real-time image into the deep neural network to identify the aid to navigation around the current ship, obtaining a position and semantic information of the aid to navigation, and determining a current position of the current ship based on the position of the aid to navigation and a relative position of the current ship with respect to the aid to navigation.

Furthermore, when the visibility in the port or maritime navigation environment is low, the texture of images collected by ship imaging equipment will be blurred with a contrast loss, seriously affecting the stability of visual system of aids to navigation, further resulting in the inability to accurately obtain position information of the aids to navigation and making the ship fail in accurate positioning. Consequently, it is impossible to carry out path planning. Therefore, the pixel values of the same points in the images in the case of good visibility are used as guide values, while the images in the case of poor visibility are filtered and the corresponding atmospheric light value is estimated to solve the transmittance, and finally the blurred image is dehazed and restored.

For the real-time images under poor visibility conditions, a transmittance is first estimated based on a variogram. The images are divided into a bright part and a dark part through the variogram, and then the transmittances of the two parts are calculated using the dark channel prior algorithm and the brightness model respectively, and finally merged into a new transmittance. A variogram is defined to obtain the highlighted area of an image, with the formula as follows:

$$S(x, y) = \lambda \sqrt{\frac{\sum_{d \in \{r,g,b\}} (I^d(x, y) - v(x, y))^2}{3}};$$

$$v(x, y) = \frac{I^r(x, y) + I^g(x, y) + I^b(x, y)}{3};$$

where d represents an RGB color space; $S(x,y)$ represents variogram values of all pixel points in the images of aids to navigation under the above-mentioned poor visibility conditions; $I^d(x,y)$ represents a pixel value of a pixel point (x,y) in any channel of r, g and b; $I^r(x,y)$, $I^g(x,y)$, and $I^b(x,y)$ respectively represent pixel values of the pixel point (x,y) in three channels, namely r, g, and b; $v(x,y)$ represents an average value of the pixel point (x,y) in the three channels of the RGB color space; and $\lambda$ represents a comparison coefficient.

A threshold $\Delta$ is defined based on the variogram to determine whether the pixel point in the image is located in the bright or dark part. When $S(x,y)<\Delta$, the pixel point is located in the bright part; when $S(x,y)\geq\Delta$, the pixel point is located in the dark part. The fused transmittance of the variogram is obtained by calculating the transmittances of the dark and bright parts of the image respectively.

In order to define the threshold more accurately, the variogram $S(x,y)$ is also calculated for the real-time images under good visibility conditions. A real-time image with its visibility higher than a preset visibility threshold is taken as an image with good visibility. When exactly one-half or three-quarters of pixel values of the continuously collected real-time images $$\frac{S(x, y)'}{RD_{p1}} RD_{p2},$$

the $$\frac{S(x, y)'}{RD_{p1}} RD_{p2}$$

are greater than the at this time is taken as a critical value which can be used to define the threshold $\Delta$. The expressions of the relative distances $RD_{p1}$ and $RD_{p2}$ are as follows:

$$\begin{cases} RD_{p1} = \dfrac{D \times \sin(\phi - \alpha)}{\sin(\alpha - \beta)} \\ RD_{p2} = \dfrac{D \times \sin(\phi - \beta)}{\sin(\alpha - \beta)} \end{cases} \text{when } \alpha < \phi$$

$$\begin{cases} RD_{p1} = \dfrac{D \times \sin(\alpha - \phi)}{\sin(\alpha - \beta)} \\ RD_{p2} = \dfrac{D \times \sin(\beta - \phi)}{\sin(\alpha - \beta)} \end{cases} \text{when } \alpha > \phi$$

where $RD_{p1}$ represents a relative distance between a center point of a real-time image p1 and the aid to navigation, $RD_{p2}$ represents a relative distance between a center point of a real-time image p2 and the aid to navigation, and the real-time image p1 and the real-time image p2 are two continuously collected real-time images containing the same aid to navigation, D represents the distance between the center point of the real-time image p1 and the center point of the real-time image p2; $\alpha$ and $\beta$ represent relative azimuth angles of the center points of the continuously collected real-time images p1 and p2 with respect to the aid to navigation respectively; and $\phi$ represents a relative azimuth angle of the center point of the real-time image p1 with respect to the center point of the real-time image p2.

The optimal threshold setting can be further demonstrated through experiments in the future.

Transmittance refinement can refine the detailed information of a transmittance map and improve the quality of image restoration under poor visibility conditions. Therefore, a guided filtering algorithm is further used to convert the images under poor visibility conditions into grayscale images as guide images to refine coarse transmittances, which can effectively eliminate block pixels in the coarse transmittances and maintain good gradient information in edge areas of the images, thereby keeping smooth image edges. The expression for defining the edge weight factor is as follows:

$$\Gamma_I(i) = \frac{1}{N} \sum_i^N \frac{\sigma_{I,i}^2(i) + \gamma}{\sigma'^2_{I,1}(i) + \gamma};$$

where $\Gamma_I(i)$ represents the edge weight factor; N represents the total number of pixels of the input image; $\sigma_{I,1}^2(i)$ represents the variance of pixel values in the entire image centered at i; $\sigma'^2_{I,1}(i)$ represents the variance of pixel values in the local window $\omega_k$ centered at i; $\gamma$ represents a fixed constant, and generally is $(0.001 \times L)^2$; L represents the grayscale range of the image, L=256 for an image with a pixel range of 8 bits; and i represents the element number in the window $\omega_k$.

By using the local variance to adaptively adjust the regularization coefficient through weighted guided filtering, the filtering effect can be improved. Therefore, the edge weight factor is introduced to construct the cost function of weighted filtering:

$$E(a_k, b_k) = \sum_{i \in \omega_k} \left( (a_k I_i + b_k - p_i)^2 + \varepsilon' a_k^2 \right);$$

$$\varepsilon' = \frac{\varepsilon}{\Gamma_I(i)};$$

$$a_k = \frac{\frac{1}{|\omega|} \sum_{i \in \omega_k} I_i p_i - \mu_k \overline{p_k}}{\sigma_k^2 + \dfrac{\varepsilon}{\Gamma_I(i)}};$$

$$b_k = \overline{p_k} - a_k \mu_k;$$

where $\omega_k$ represents a local rectangular window; $a_k$ and $b_k$ respectively represent constant coefficients when the window $\omega_k$ is centered at k, k represents a pixel number; $p_i$ represents the i-th output pixel; $\mu_k$ and $\sigma_k^2$ respectively represent mean and variance in the local window $\omega_k$; $\overline{p_k}$ represents mean of pixel values of all pixels in the image within the local window $\omega_k$; |ω| represents the number of pixels in the local window $\omega_k$; $I_i$ represents a guide image, namely a grayscale image of a real-time image; ε represents a penalty factor to present $a_k$ from being too large, which generally is a fixed value greater than 0 to make ε' small in the edge area but large in the smooth area of the image while making the corresponding $a_k$ large in the edge area but small in the smooth area of the image, thereby meeting the requirements of each area of the image; $\Gamma_I(i)$ represents the edge weight factor; $E(a_k,b_k)$ represents the weighted filtering cost; and i represents the element number in the window $\omega_k$. The finally obtained expression of weighted guided filtering is as follows:

$$q_i = a_k I_i + b_k, \forall i \in \omega_k;$$

where $q_i$ represents an output image.

Thus, an expression for calculating the refined transmittance is as follows:

$$t = a_k I_i + b_k, \forall i \in \omega_k$$

where $I_i$ represents a guide image, namely a grayscale image of the real-time image; t represents the refined transmittance; $\omega_k$ represents a local rectangular window; $a_k$ and $b_k$ respectively represent constant coefficients when the window $\omega_k$ is centered at k.

By refining coarse transmittances through guided filtering and weighted guided filtering, not only the block effect of the coarse transmittance map can be solved, but also image details can be better retained, greatly improving the accuracy of identifying aids to navigation.

The atmospheric light value A is an important parameter for image dehazing and restoration. A search algorithm can be used to divide an image of an aid to navigation into four parts. By calculating a difference between mean and standard deviation of pixel values of all pixels in the image within each part as a score, selecting the area with the highest score as a candidate area, and repeating the above operations until the number of pixel points in the candidate area is less than 1% of the original image, the atmospheric light value A can be obtained, i.e. the average pixel value of the candidate area.

Specially, the real-time image is evenly divided into four areas. A difference between mean and standard deviation of pixels in each of the areas is calculated as an area score. The area with the highest area score is selected as a candidate area. If the number of pixel points in the candidate area is less than a preset pixel point threshold, an average pixel value of the candidate area is output as an atmospheric light value. Otherwise, area division and area scoring are performed on the candidate area again until the number of pixel points in a selected candidate area is less than the preset pixel point threshold.

Finally, the obtained refined transmittance t(x) and the atmospheric light value A are substituted into an atmospheric scattering model, pixel values in a dehazed and restored image J(x) can be obtained as follows:

$$J(x) = \frac{I(x) - A}{\max[t(x), t_0]} + A;$$

where I(x) represents pixel values in a real-time image with poor visibility; A represents the atmospheric light value; t(x) represents the refined transmittance; to represents a preset lower transmittance threshold, which generally is 0.1; and max[ ] represents taking the larger of two values.

Since a to-be-identified aid to navigation may be obscured by other ships moving around, for continuously collected images, real-time detection and prediction of moving objects are performed. The predicted information includes x, y, w, h, s, and c, where (x,y) represents the coordinates of the center point of the prediction box; w and h respectively represent width and height of the prediction box; s represents the score of the prediction box, i.e. the possibility of the prediction box falling in a certain class; and c represents the predicted class. The lower the target's prediction score, the more likely it is that the target is obscured. After obtaining the predicted value of the candidate box, when s>σ, it is deemed that the target is not obscured, where σ represents an empirical value obtained through experimental testing, which may also be set based on the aforementioned experimental results without obstruction. Otherwise, it is deemed that the image is obscured, and the target object needs to be further confirmed from the nearest image. Therefore, during the implementation process, a certain number of images of the current image need to be saved and updated to establish a caching mechanism.

Specially, the relationship between the aid to navigation and the current ship in a relative space is estimated, including the relative azimuth angle, relative pitch angle, and relative distance.

The formula of calculating the relative azimuth angle of the current ship with respect to the aid to navigation is as follows.

$$\begin{cases} Ang_{azimuth} = 0°, \mu = \dfrac{\text{pixel}_{\mu\_sum} - 1}{2} \\ Ang_{azimuth} = \dfrac{2\mu - \text{pixel}_{\mu\_sum} + 1}{\text{pixel}_{\mu\_sum}} \times 180°, \mu > \dfrac{\text{pixel}_{\mu\_sum} - 1}{2} \\ Ang_{azimuth} = \dfrac{\text{pixel}_{\mu\_sum} - 2\mu - 1}{\text{pixel}_{\mu\_sum}} \times 180°, \mu < \dfrac{\text{pixel}_{\mu\_sum} - 1}{2} \end{cases};$$

where $Ang_{azimuth}$ represents the relative azimuth angle of the current ship with respect to the aid to navigation; μ represents a coordinate value of a μ-axis, with the μ-axis parallel to the width axis of the real-time image; and $\text{pixel}_{\mu\_sum}$ represents a sum of the number of pixels on the μ-axis.

The relative pitch angle of the current ship with respect to the aid to navigation can be calculated from the coordinate value of the v-axis on an equidistant cylindrical projection system:

$$\begin{cases} Ang_{elevation} = 0°, v = \dfrac{\text{pixel}_{v\_sum} - 1}{2} \\ Ang_{elevation} = \dfrac{2v - \text{pixel}_{v\_sum} + 1}{\text{pixel}_{v\_sum}} \times (-90°), v > \dfrac{\text{pixel}_{v\_sum} - 1}{2} \\ Ang_{elevation} = \dfrac{\text{pixel}_{v\_sum} - 2v - 1}{\text{pixel}_{v\_sum}} \times 90°, v < \dfrac{\text{pixel}_{v\_sum} - 1}{2} \end{cases};$$

where $Ang_{elevation}$ represents the relative pitch angle of the current ship with respect to the aid to navigation; v represents the coordinate value of the v-axis, with the v-axis parallel to the elevation axis of the real-time image; and $pixel_{v\text{-}sum}$ represents a sum of the number of pixels on the v-axis;

A midpoint can be found by dividing the sum of the number of pixels by 2. As the midpoint is usually close to the center of the image, $$\frac{pixel_{\mu\_sum} - 1}{2}$$

actually represents the μ-axis coordinate of the center point of the real-time image in the image coordinate system. Similarly, $$\frac{pixel_{v\_sum} - 1}{2}$$

actually represents the v-axis coordinate of the center point of the real-time image in the image coordinate system.

In order to obtain the relative distance, the center point of the aid to navigation can be used as a matching point, and then the relative distance relationship between the aid to navigation and the current ship can be derived. The specific steps to calculate the relative distance are as follows:

Firstly, calculating the distance between the center points of two continuously collected real-time images p1 and p2 by the following formula:

$$D = R \times \cos^{-1}\left\{\begin{array}{l}\cos[\text{rad}(lat_{p1})]\cos[\text{rad}(lat_{p1})] \\ \cos[\text{rad}(lon_{p1} - lon_{p2})] + \sin[\text{rad}(lat_{p1})]\sin[\text{rad}(lat_{p2})]\end{array}\right\} \times \pi/180;$$

where D represents the distance between a center point of the real-time image p1 and a center point of the real-time image p2, and the real-time image p1 and the real-time image p2 are two continuously collected real-time images containing the same aid to navigation; R represents the Earth's radius; ($lat_{p1}$,$lon_{p1}$) represents a coordinate of the center point of the real-time image p1 in a latitude and longitude coordinate system, ($lat_{p2}$,$lon_{p2}$) represents a coordinate of the center point of the real-time image p2 in a latitude and longitude coordinate system; and rad( ) represents converting degrees into radians.

Secondly, calculating the relative distances $RD_{p1}$ and $RD_{p2}$ by the following formulas:

$$\begin{cases}RD_{p1} = \dfrac{D \times \sin(\phi - \alpha)}{\sin(\alpha - \beta)} \\ RD_{p2} = \dfrac{D \times \sin(\phi - \beta)}{\sin(\alpha - \beta)}\end{cases} \text{ when } \alpha < \phi$$

$$\begin{cases}RD_{p1} = \dfrac{D \times \sin(\alpha - \phi)}{\sin(\alpha - \beta)} \\ RD_{p2} = \dfrac{D \times \sin(\beta - \phi)}{\sin(\alpha - \beta)}\end{cases} \text{ when } \alpha > \phi$$

where $RD_{p1}$ represents a relative distance between a center point of a real-time image p1 and the aid to navigation, $RD_{p2}$ represents a relative distance between a center point of a real-time image p2 and the aid to navigation; D represents the distance between the center point of the real-time image p1 and the center point of the real-time image p2; α represents a relative azimuth angle of the center point of the real-time image p1 with respect to the aid to navigation, β represents a relative azimuth angle of the center point of the real-time image p2 with respect to the aid to navigation; and ϕ represents a relative azimuth angle of the center point of the real-time image p1 with respect to the center point of the real-time image p2.

As the real-time images p1 and p2 are collected at different times by the current ship during navigation, the center points of the real-time images p1 and p2 represent the positions of the current ship at different times. Specially, the real-time image p2 is collected at a current moment by the current ship and the real-time image p1 is collected at a previous moment by the current ship. Thus, D can be considered as the current ship's navigation distance from the previous moment to the current moment. A speed of the current ship can be obtained based on the current ship's navigation distance and an acquisition time interval between two continuously collected real-time images p1 and p2. Further, $RD_{p1}$ represent the relative distance of the current ship at the previous moment with respect to the aid to navigation, and $RD_{p2}$ represent the relative distance of the current ship at the current moment with respect to the aid to navigation. α and β respectively are the relative azimuth angles $Ang_{azimuth}$ at the previous moment and the current moment. ϕ can be obtained by the coordinates ($lat_{p1}$,$lon_{p1}$) and ($lat_{p2}$,$lon_{p2}$).

S3: excluding dangerous areas, prohibited areas, and operation areas around the current ship to obtain a navigable area of the current ship based on the semantic information of the aid to navigation and the current position of the current ship.

Specifically, the navigable area of the current ship can be obtained based on the semantic information of various aids to navigation and the current position of the current ship, thereby avoiding dangerous areas, prohibited waters, navigation operation areas, submerged structures, entertainment areas, and aquatic operations areas to ensure the current ship sails in a safe area. For example, the semantic information of various aids to navigation include cardinal marks, danger marks, safe water marks, prohibited water marks, navigation operation area marks, submerged structure marks, entertainment area marks, and aquatic operation area marks.

S4: determining whether the current ship may encounter an encountering ship in the navigable area: if so, obtaining a relative speed, relative course, and relative distance of the current ship with respect to the encountering ship based on the real-time image, assessing the collision risk to obtain high risk areas, and removing portions that overlap with the high risk areas from the navigable area; if not, directly performing the step S5 below.

Specifically, the steps to determine whether the current ship may encounter the encountering ship in the navigable area are as follows:

calculating a relative angle $\theta_{tabenchuan}$ between the two ships by the following formula:

$$\theta_{tabenchuan} = \begin{cases} \arctan\dfrac{y_{tachuan} - y_{benchuan}}{x_{tachuan} - x_{benchuan}}, & x_{tachuan} - x_{benchuan} > 0, y_{tachuan} - y_{benchuan} \geq 0 \\ 360° + \arctan\dfrac{y_{tachuan} - y_{benchuan}}{x_{tachuan} - x_{benchuan}}, & x_{tachuan} - x_{benchuan} > 0, y_{tachuan} - y_{benchuan} < 0 ; \\ 180° + \arctan\dfrac{y_{tachuan} - y_{benchuan}}{x_{tachuan} - x_{benchuan}}, & x_{tachuan} - x_{benchan} < 0 \end{cases}$$

where $(x_{tachuan}, y_{tachuan})$ and $(x_{benchuan}, y_{benchuan})$ respectively represent position coordinates of the encountering ship and the current ship, which are obtained by transforming the latitude and longitude coordinates through Mercator projection;

calculating the relative distance Rd of the current ship with respect to the encountering ship by the following formula:

$$Rd = \sqrt{(x_{tachuan} - x_{benchuan})^2 + (y_{tachuan} - y_{benchuan})^2}$$

where $(x_{tachuan}, y_{tachuan})$ and $(x_{benchuan}, y_{benchuan})$ respectively represent position coordinates of the encountering ship and the current ship, which are obtained by transforming the latitude and longitude coordinates through Mercator projection;

obtaining a speed of the encountering ship based on the speed of the current ship, an acquisition time interval between two continuously collected images of the encountering ship, and the relative position relationship (including relative distance and relative angle) between the current ship and the encountering ship; and if the relative distance is less than a preset threshold, which is generally set as 3-6 nautical miles and can be adjusted according to the actual conditions of the experimental waters, and $6° < \theta_{tabenchuan} < 112.5°$ or $224.5° < \theta_{tabenchuan} < 354°$, a crossing encounter occurs between the two ships; if the relative distance is less than the preset threshold, $112.5° < \theta_{tabenchuan} < 224.5°$, and the speed of encountering ship is higher than that of the current ship, an overtaking encounter occurs between the two ships; and if the relative distance is less than the preset threshold, and $0° < \theta_{tabenchuan} < 6°$ or $354° < \theta_{tabenchuan} < 360°$, a head-on encounter occurs between the two ships. In the aforementioned cases, the current ship has a collision risk.

Further, a set of target images in which the encountering ship exists is established. The relative course and relative distance of the current ship with respect to the encountering ship in each image are determined in turn. Then, in combination with the speeds of the current ship and the encountering ship, the relative speed between the current ship and the encountering ship is obtained. The relative distance between the current ship and encountering ship is calculated by the formula for calculating Rd.

Based on the relative speed, relative course, and relative distance, the collision risk Risk(Rd,Rv,Rc) can be calculated by the following formula:

$$\text{Risk}(Rd,Rv,Rc) = (l_1 \times Rd^{-1} \times Rv)(l_2 \sin(Rc) + l_3 \sin(2Rc));$$

where Rd, Rv and Rc respectively represent the relative distance, relative speed, and relative course of the current ship with respect to the encountering ship; $l_1$, $l_2$, and $l_3$ represent constants, which can be obtained based on the ship safe domain in the experimental waters or jointly obtained based on the relative motion characteristics between encountering ships. For example, as for the ship encounter situation, when collision avoidance ends, Risk(Rd,Rv,Rc)=0; when the ship safe domain is violated, Risk(Rd,Rv,Rc)=100; $l_1$, $l_2$, and $l_3$ can be solved through these equations; and the ship safe domain can be solved based on the length, width, and speed of the ship, as well as the characteristics of the waters.

Specifically, the relative course needs to be calculated based on the course vector lines of both the current ship and the encountering ship. Taking times 1 and 2 as an example, the course vector lines of the current ship and the encountering ship are $(x_{x_{benchuan,2}} - x_{benchuan,1}, y_{benchuan,2} - y_{benchuan,1})$ and $(x_{tachuan,2} - x_{tachuan,1}, y_{tachuan,2} - y_{tachuan,1})$ respectively, and then the relative course vector line of the current ship with respect to the encountering ship is $(x_{tachuan,2} - x_{tachuan,1} - (x_{benchuan,2}, x_{benchuan,1}), y_{tachuan,2} - y_{tachuan,1} - (y_{benchuan,2}, y_{benchuan,1})$.

The formula for calculating the relative course Rc between the current ship and the encountering ship is as follows:

$$Rc = \begin{cases} \arctan\dfrac{y_{tachuan,2} - y_{tachuan,1} - (y_{benchuan,2} - y_{benchuan,1})}{x_{tachuan,2} - x_{tachuan,1} - (x_{benchuan,2} - x_{benchuan,1})}, & x_{tachuan,2} - x_{tachuan,1} - (x_{benchuan,2} - x_{benchuan,1}) > 0, \\ & y_{tachuan,2} - y_{tachuan,1} - (y_{benchuan,2} - y_{benchuan,1}) \geq 0 \\ \arctan\dfrac{y_{tachuan,2} - y_{tachuan,1} - (y_{benchuan,2} - y_{benchuan,1})}{x_{tachuan,2} - x_{tachuan,1} - (x_{benchuan,2} - x_{benchuan,1})} + 2\pi, & x_{tachuan,2} - x_{tachuan,1} - (x_{benchuan,2} - x_{benchuan,1}) > 0, \\ & y_{tachuan,2} - y_{tachuan,1} - (y_{benchuan,2} - y_{benchuan,1}) < 0 \\ \arctan\dfrac{y_{tachuan,2} - y_{tachuan,1} - (y_{benchuan,2} - y_{benchuan,1})}{x_{tachuan,2} - x_{tachuan,1} - (x_{benchuan,2} - x_{benchuan,1})} + \pi, & x_{tachuan,2} - x_{tachuan,1} - (x_{benchuan,2} - x_{benchuan,1}) < 0 \\ \dfrac{\pi}{2}, & x_{tachuan,2} - x_{tachuan,1} - (x_{benchuan,2} - x_{benchuan,1}) = 0,\ y_{tachuan,2} - y_{tachuan,1} - (y_{benchuan,2} - y_{benchuan,1}) > 0 \\ \dfrac{3\pi}{2}, & x_{tachuan,2} - x_{tachuan,1} - (x_{benchuan,2} - x_{benchuan,1}) = 0,\ y_{tachuan,2} - y_{tachuan,1} - (y_{benchuan,2} - y_{benchuan,1}) < 0 \\ 0, & x_{tachuan,2} - x_{tachuan,1} - (x_{benchuan,2} - x_{benchuan,1}) = 0,\ y_{tachuan,2} - y_{tachuan,1} - (y_{benchuan,2} - y_{benchuan,1}) = 0 \end{cases}$$

The formula for calculating the relative speed Rv between the current ship and the encountering ship is as follows:

$$Rv = \sqrt{v_{benchuan}^2 + v_{tachuan}^2 - 2v_{benchuan}v_{tachuan}\cos Rc}$$

where $v_{benchuan}$ and $v_{tachuan}$ represent the speeds of the current ship and the encountering ship respectively.

After normalizing the collision risk, the risk value is greater than 0.33 and less than or equal to 0.67, indicating that timely attention is required to prevent collision; a risk value greater than 0.67 indicates immediate avoidance is required; and a risk value less than 0.33 indicates relative safety. The specific threshold can also be adjusted according to the traffic conditions in the navigable area and the captain's navigation experience. After excluding high-risk areas, a safer navigable area can be obtained for the ship.

Furthermore, the ship speed requirements for different navigation fairways can be obtained in combination with the navigation rules of the port, such as "the maximum speed east of the * light buoy in the main navigation fairway shall not exceed 15 kn", "the maximum speed west of the * light buoy in the main navigation fairway shall not exceed 13 kn", "the minimum speed in the main navigation fairway shall not be less than 5 kn", "the maximum speed of ships of 100,000 tons or more or carrying special dangerous goods in another fairway shall not exceed 10 knots", "the maximum speed of other ships shall not exceed 13 knots", and "the minimum speed in the navigation fairway without permission shall not be less than 5 knots". Based on the current position (x,y) and an optional position ($x_t$, $y_t$), it can be calculated whether the optional position is on the east or west side of the aid to navigation in the navigation fairway. Taking "the maximum speed of ships of 100,000 tons or more or carrying special dangerous goods shall not exceed 10 knots", "the maximum speed of other ships shall not exceed 13 knots", and "the minimum speed in the navigation fairway without permission shall not be less than 5 knots" as examples, the optional position ($x_t$, $y_t$) of the ship in time t can be calculated by the following formula:

$$\begin{cases} \sqrt{(y_t - y)^2 + (x_t - y)^2} \leq \\ v'_{max}t \text{ (if Dead}_{ship\_i} \geq \text{A\_Dead or ship\_i is a ship carrying hazardous chemicals)} \\ \sqrt{(y_t - y)^2 + (x_t - y)^2} \leq \\ v_{max}t \text{ (if Dead}_{ship\_i} < \text{A\_Dead, ship\_i is not a ship carrying hazardous chemicals)} \\ \sqrt{(y_t - y)^2 + (x_t - y)^2} \geq v_{min}t \end{cases}$$

where (x,y) represents the coordinate of the current position; $(x_t, y_t)$ represent the coordinate of the optional position; A_Dead represents the 100,000-ton threshold specified for the navigation fairway; $v_{max}$ represents the maximum speed limit for ships that neither exceed the 100,000-ton threshold nor carry hazardous chemicals; and $v_{max}$ represents the maximum speed limit for ships exceeding the 100,000-ton threshold or carrying hazardous chemicals. The tonnage, draft, carried cargo type, and other information of the ship can be obtained from the ship registry database.

S5: assigning probabilities to positions in the navigable area that meet azimuth requirements of the current ship based on a historical arrival frequency of the current ship, and selecting a position with the highest probability as the next position of the current ship. The historical arrival frequency refers to the frequency at which the current ship has ever reached the navigable area.

Preferably, the step of obtaining the positions that meet the azimuth requirements of sailing of the current ship includes:

calculating a first included angle $\theta_{(x,y)(x_{nm},y_{nm})}$ between the current position (x,y) of the current ship and the aid to navigation $(x_{nm}, y_{nm})$, and a second included angle $\theta_{(x,y)(x_{nm},y_{nm})}$ between an optional position $(x_t, y_t)$ and the aid to navigation $(x_{nm}, y_{nm})$ respectively by the following formulas:

$$\theta_{(x,y)(x_{nm},y_{nm})} = \begin{cases} \arctan\frac{y-y_{nm}}{x-x_{nm}}, & x-x_{nm} > 0, y-y_{nm} \geq 0 \\ 360° + \arctan\frac{y-y_{nm}}{x-x_{nm}}, & x-x_{nm} > 0, y-y_{nm} < 0; \\ 180° + \arctan\frac{y-y_{nm}}{x-x_{nm}}, & x-x_{nm} < 0 \end{cases}$$

$$\theta_{(x_t,y_t)(x_{nm},y_{nm})} = \begin{cases} \arctan\frac{y_t-y_{nm}}{x_t-x_{nm}}, & x_t-x_{nm} > 0, y_t-y_{nm} \geq 0 \\ 360° + \arctan\frac{y_t-y_{nm}}{x_t-x_{nm}}, & x_t-x_{nm} > 0, y_t-y_{nm} < 0; \\ 180° + \arctan\frac{y_t-y_{nm}}{x_t-x_{nm}}, & x_t-x_{nm} < 0 \end{cases}$$

if the second included angle $\theta_{(x,y)(x_{nm},y_{nm})}$ is greater than the first included angle $\theta_{(x,y)(x_{nm},y_{nm})}$, the azimuth limit of the current ship sailing forward is satisfied, and a set of optional next positions that can fall within the safe area and meet the azimuth requirements can be obtained. The optional position refers to a position in a remaining area, and the remaining area is obtained by removing the areas that coincide with the high-risk areas from the navigable area.

S6: repeating the above steps to make real-time corrections to the current ship's navigation path.

In order to further evaluate accuracy of a generated navigation path, a customary route may be obtained through clustering based on the historical AIS trajectories of the same type of ships, and compared with the navigation path generated by this method to evaluate the feasibility and robustness of the proposed method.

In a further embodiment, the intelligent ship navigation path generation method of the present invention is used for a navigation of an intelligent ship. In an intelligent ship navigation method, after the above-mentioned steps S1-S6, a step that the intelligent ship navigates according to the real-time corrected navigation path obtained from the step S6 is further included.

The technical features of the above embodiments can be combined in any way. To simplify the description, not all possible combinations of the technical features in the above embodiments are described. The above embodiments only illustrate the preferred embodiments of the present invention, and the description thereof is relatively specific and detailed, but it should not be construed as a limitation on the claims of the present invention. As long as there is no contradiction in the combinations of the technical features, they shall be considered to fall within the scope of this specification.

It should be noted that for the person of ordinary skill in the art, various modifications and improvements can be made without departing from the concept of the present invention and shall all fall within the protection scope of the present invention. Therefore, the protection scope of the present invention shall be subject to the appended claims.

What is claimed is:

1. An intelligent ship navigation path generation method based on visual and spatial semantic enhancement for an aid to navigation, comprising:

S1: collecting a real-time image during navigation of a ship, inputting the real-time image into a deep neural network to identify the aid to navigation around the ship, and determining a current position of the ship based on a position of the aid to navigation and a relative position of the ship with respect to the aid to navigation;

the relative position of the ship with respect to the aid to navigation comprises a relative azimuth angle, relative pitch angle, and relative distance, and an expression for calculating the relative azimuth angle is as follows:

$$\begin{cases} Ang_{azimuth} = 0°, & \mu = \frac{pixel_{\mu\_sum}-1}{2} \\ Ang_{azimuth} = \frac{2\mu - pixel_{\mu\_sum}+1}{pixel_{\mu\_sum}} \times 180°, & \mu > \frac{pixel_{\mu\_sum}-1}{2}; \\ Ang_{azimuth} = \frac{pixel_{\mu\_sum}-2\mu-1}{pixel_{\mu\_sum}} \times 180°, & \mu < \frac{pixel_{\mu\_sum}-1}{2} \end{cases}$$

wherein $Ang_{azimuth}$ represents the relative azimuth angle of the ship with respect to the aid to navigation; μ represents a coordinate value of a μ-axis, the μ-axis is parallel to a width axis of the real-time image; and $pixel_{\mu\_sum}$ represents a sum of pixels in the direction of the μ-axis;

an expression for calculating the relative pitch angle is as follows:

$$\begin{cases} Ang_{elevation} = 0°, & v = \frac{pixel_{v\_sum}-1}{2} \\ Ang_{elevation} = \frac{2v - pixel_{v\_sum}+1}{pixel_{v\_sum}} \times (-90°), & v > \frac{pixel_{v\_sum}-1}{2}; \\ Ang_{elevation} = \frac{pixel_{v\_sum}-2v-1}{pixel_{v\_sum}} \times 90°, & v < \frac{pixel_{v\_sum}-1}{2} \end{cases}$$

wherein $Ang_{elevation}$ represents the relative pitch angle of the ship with respect to the aid to navigation; ν represents a coordinate value of a ν-axis, the ν-axis is parallel to an elevation axis of the real-time image; and pixel, sum represents a sum of pixels in the direction of the ν-axis;

an expression for calculating the relative distance is as follows:

$$D = R \times \cos^1\left\{\begin{matrix}\cos[rad(lat_{p1})]\cos[rad(lat_{p1})]\\ \cos[rad(lon_{p1}-lon_{p2})]+\sin[rad(lat_{p1})]\sin[rad(lat_{p2})]\end{matrix}\right\} \times \pi/180;$$

wherein R represents the Earth's radius; $(lat_{p1}, lon_{p1})$ and $(lat_{p2}, lon_{p2})$ respectively represent coordinates of center points of continuously collected real-time images p1 and p2; and rad( ) represents converting degrees into radians;

S2: excluding dangerous areas, prohibited areas, and operation areas around the ship to obtain a navigable area of the ship based on semantic information of the aid to navigation;

S3: determining whether an encountering ship exists in the navigable area: if so, obtaining a relative speed, relative course, and relative distance of the ship with respect to the encountering ship based on the real-time image, assessing a collision risk of the ship to obtain high risk areas of collisions for the ship, and removing portions that overlap with the high risk areas from the navigable area; if not, directly performing step S4;

S4: assigning probabilities of positions in the navigable area that meet azimuth requirements of sailing of the ship based on a historical arrival frequency of the ship, and selecting a position with the highest probability as a next position of the ship; and S5: repeating the steps S1-S4 to make real-time corrections to the ship's navigation path.

2. The intelligent ship navigation path generation method based on visual and spatial semantic enhancement for an aid to navigation of claim 1, wherein in the step S3, an image set is constructed by continuously collecting real-time images, the relative course and relative distance of the current ship with respect to a surrounding ship are determined based on the image set, and in combination with a speed of the current ship, the relative speed of the current ship with respect to the surrounding ship is obtained.

3. The intelligent ship navigation path generation method based on visual and spatial semantic enhancement for an aid to navigation of claim 2, wherein in the step S3, an expression for calculating the collision risk is as follows:

$$\text{Risk}(Rd,Rv,Rc) = (l_1 \times Rd^{-1} \times Rv)(l_2 \sin(Rc) + l_3 \sin(2Rc));$$

wherein Rd, Rv, and Rc respectively represent the relative distance, relative speed, and relative course of the ship with respect to the surrounding ship; and $l_1$, $l_2$, and $l_3$ represent constants.

4. The intelligent ship navigation path generation method based on visual and spatial semantic enhancement for an aid to navigation of claim 1, wherein in the step S4, the step of obtaining the positions that meet the azimuth requirements of sailing of the ship comprises the following steps:

S41: calculating a first included angle $\theta_{(x,y)(x_{nm},y_{nm})}$ between the current position (x,y) of the ship and the aid to navigation $(x_{nm}, y_{nm})$:

$$\theta_{(x,y)(x_{nm},y_{nm})} = \begin{cases} \arctan\frac{y-y_{nm}}{x-x_{nm}}, & x-x_{nm} > 0, y-y_{nm} \geq 0 \\ 360° + \arctan\frac{y-y_{nm}}{x-x_{nm}}, & x-x_{nm} > 0, y-y_{nm} < 0; \\ 180° + \arctan\frac{y-y_{nm}}{x-x_{nm}}, & x-x_{nm} < 0 \end{cases}$$

S42: randomly selecting a position $(x_t, y_t)$ in a remaining area, and calculating a second included angle $\theta_{(x_t,y_t)(x_{nm},y_{nm})}$ between the position and the aid to navigation:

$$\theta_{(x_t,y_t)(x_{nm},y_{nm})} = \begin{cases} \arctan\frac{y_t-y_{nm}}{t-x_{nm}}, & x_t-x_{nm} > 0, y_t-y_{nm} \geq 0 \\ 360° + \arctan\frac{y_t-y_{nm}}{x_t-x_{nm}}, & x_t-x_{nm} > 0, y_t-y_{nm} < 0; \\ 180° + \arctan\frac{y_t-y_{nm}}{x_t-x_{nm}}, & x_t-x_{nm} < 0 \end{cases}$$

S43: taking positions where the first included angle is smaller than the second included angle as the positions that meet the azimuth requirements of sailing of the ship.

5. The intelligent ship navigation path generation method based on visual and spatial semantic enhancement for an aid to navigation of claim 1, wherein in the step S1, when visibility during ship navigation is lower than a preset visibility threshold, the real-time image is dehazed and restored, comprising the following steps:

S11: calculating variogram values of all pixel points in the real-time image, taking pixel points whose variogram values are less than a preset variogram threshold as bright parts of the real-time image and remaining pixel points as dark parts thereof, and calculating transmittances of the bright parts and the dark parts respectively to obtain a fused transmittance of the real-time image, wherein an expression for calculating the variogram values is as follows:

$$S(x,y) = \lambda \sqrt{\frac{\sum_{d \in \{r,g,b\}}(I^d(x,y) - v(x,y))^2}{3}};$$

$$v(x,y) = \frac{I^r(x,y) + I^g(x,y) + I^b(x,y)}{3};$$

wherein $I^d(x,y)$ represents a pixel value of a pixel point (x,y) in any channel; $I^r(x,y)$, $I^g(x,y)$, and $I^b(x,y)$ respectively represent pixel values of the pixel point (x,y) in three channels, namely r, g, and b; $v(x,y)$ represents an average value of the pixel point (x,y) in the three channels of an RGB color space; and $\lambda$ represents a comparison coefficient;

S12: filtering the fused transmittance through a weighted guided filtering algorithm to obtain a refined transmittance of the real-time image, wherein an expression for calculating the refined transmittance is as follows:

$$t = a_k I_i + b_k, \forall i \in \omega_k;$$

$$a_k = \frac{\frac{1}{|\omega|}\sum_{i \in \omega_k} I_i p_i - \mu_k \overline{p_k}}{\sigma_k^2 + \frac{\varepsilon}{\Gamma_I(i)}}$$

$$b_k = \overline{p_k} - a_k \mu_k;$$

$$\Gamma_I(i) = \frac{1}{N}\sum_i^N \frac{\sigma_{I,1}^2(i) + \gamma}{\sigma_{I,1}'^2(i) + \gamma};$$

wherein $I_i$ represents a guide image, namely a grayscale image of the real-time image; t represents the refined transmittance; $|\omega|\equiv$ represents the number of pixels in a local window $\omega_x$; $p_i$ represents the i-th output pixel; $\mu_k$ and $\sigma_k^2$ respectively represent mean and variance in the local window $\omega_k$; $\overline{p}_k$ represents mean of pixel points in the window; $\varepsilon$ represents a penalty factor to prevent ax from being too large; N represents the total number of pixels of the image; $\sigma_{l,1}^2(i)$ represents variance of the entire image centered at i; $\sigma'_{l,1}{}^2(i)$ represents variance in the local window $\omega_k$ centered at i; $\gamma$ represents a fixed constant;

S13: dividing the real-time image evenly into four areas, calculating a difference between mean and standard deviation of pixels in each of the areas as an area score, selecting the area with the highest area score as a candidate area, and if the number of pixel points in the candidate area is less than a preset pixel point threshold, outputting an average pixel value of the candidate area as an atmospheric light value, otherwise, performing area division and area scoring on the candidate area again until the number of pixel points in a selected candidate area is less than the preset pixel point threshold;

S14: substituting the refined transmittance and the atmospheric light value into an atmospheric scattering model to obtain a dehazed image, wherein an expression of the atmospheric scattering model is as follows:

$$J(x) = \frac{I(x) - A}{\max[t(x), t_0]} + A;$$

wherein J(x) represents a dehazed and restored image; I(x) represents the real-time image; A represents the atmospheric light value; t(x) represents the refined transmittance; $t_0$ represents a preset transmittance threshold; and max[ ] represents taking the larger of two values.

6. The intelligent ship navigation path generation method based on visual and spatial semantic enhancement for an aid to navigation of claim 5, wherein in the step S11, a method for obtaining a variogram threshold comprises the following steps:

taking a real-time image with its visibility higher than a preset visibility threshold as an image with good visibility; calculating a variogram S(x,y) of the real-time image with good visibility; obtaining continuously collected real-time images p1 and p2; calculating relative distances $RD_{p1}$ and $RD_{p2}$ of the current ship with respect to center points of p1 and p2 respectively; and when exactly one-half or three-quarters of pixel values of the real-time image are greater than $$\frac{S(x, y)'}{RD_{p1}} RD_{p2},$$

taking $$\frac{S(x, y)'}{RD_{p1}} RD_{p2}$$

at this time as a critical value for defining a threshold $\Delta$, wherein expressions for calculating the relative distances $RD_{p1}$ and $RD_{p2}$ of the current ship with respect to the center points of p1 and p2 are as follows:

$$\begin{cases} \begin{cases} RD_{p1} = \frac{D \times \sin(\phi - \alpha)}{\sin(\alpha - \beta)} \\ RD_{p2} = \frac{D \times \sin(\phi - \beta)}{\sin(\alpha - \beta)} \end{cases} \text{ when } \alpha < \phi \\ \begin{cases} RD_{p1} = \frac{D \times \sin(\alpha - \phi)}{\sin(\alpha - \beta)} \\ RD_{p2} = \frac{D \times \sin(\beta - \phi)}{\sin(\alpha - \beta)} \end{cases} \text{ when } \alpha > \phi \end{cases};$$

wherein $\alpha$ and $\beta$ respectively represent relative azimuth angles of the current ship with respect to the center points of p1 and p2; and $\phi$ represents a relative angle between p1 and p2.

7. The intelligent ship navigation path generation method based on visual and spatial semantic enhancement for an aid to navigation of claim 1, wherein in the step S1, performing an image enhancement operation on the real-time image to expand a training set for neural network;

the image enhancement operation comprises random cropping, random flipping, random color adjustment, random noise addition, and random blurring;

the random cropping arbitrarily crops the real-time image to change a size and content of the real-time image;

the random flipping randomly flips the real-time image up and down or left and right;

the random color adjustment randomly adjusts contrast, brightness, and saturation of the real-time image;

the random noise addition randomly adds noise to the real-time image; and the random blurring uses Gaussian blurring or a median filter to randomly blur the real-time image.

8. The intelligent ship navigation path generation method based on visual and spatial semantic enhancement for an aid to navigation of claim 1, wherein a loss function is set to evaluate prediction accuracy of the deep neural network, and an expression of the loss function is as follows:

$$F = IOU^\gamma L_{EIOU};$$

$$L_{EIOU} = 1 - IOU + \frac{\rho^2(b, b^{gt})}{c^2} + \frac{\rho^2(\omega, \omega^{gt})}{C_w^2} + \frac{\rho^2(h, h^{gt})}{C_h^2};$$

$$IOU = \frac{A \cap B}{A \cup B};$$

wherein $\gamma$ represents a suppression parameter; A and B represent any two surrounding boxes; b and $b^{gt}$ respectively represent center points of a prediction box and a ground truth box; $\rho$ represents an Euclidean distance between the center points of the prediction box and the ground truth box; c represents length of a diagonal of a bounding box; $C_w$ and $C_h$ respectively represent width and height of a minimum bounding rectangle of the prediction box and the ground truth box; $w^{gt}$ and $h^{gt}$ respectively represent width and height of the ground truth box; and W and h respectively represent width and height of the prediction box.

* * * * *